United States Patent [19]

Taylor

[11] 4,117,235
[45] Sep. 26, 1978

[54] NOVEL PREPARATION OF NOVEL LOW MOLECULAR WEIGHT, LIQUID POLYMER

[75] Inventor: Lynn J. Taylor, Haslett, Mich.

[73] Assignee: Owens-Illinois, Inc., Toledo, Ohio

[21] Appl. No.: 183,275

[22] Filed: Sep. 23, 1971

[51] Int. Cl.$^2$ ............................................. C07C 69/54
[52] U.S. Cl. .................................................. 560/205
[58] Field of Search ................................... 260/486 R

[56] References Cited

U.S. PATENT DOCUMENTS

| 2,412,296 | 12/1946 | Shapiro | 560/216 |
| 2,752,387 | 6/1956 | Rehberg | 560/81 |

OTHER PUBLICATIONS

Zharov et al. (Zharov), Russ. J. Phys. Chem., 38, 1485–1487 (1964).
Feit, European Polymer J., 3, 523–534 (1967).
Shimomura et al. (Shimomura), Kogyo Kaguku Zasshi, 71, 1074–1077 (1968).
Trekoval et al. (Trekoval), Chem. prum., 18, 312–315 (1968).
Heitz et al. (Heitz), Makromol, Chem., 121, 102–116 (1969).
Flory, P. J., Principles of Polymer Chemistry, Cornell Univ. Press, Ithaca, New York, pp. 51 and 145–146 (1953).
Lenz, R. W., Organic Chemistry of Synthetic High Polymers, Interscience, New York, pp. 325–329 (1967).
Stille, J., Introduction to Polymer Chemistry, Wiley, New York, N.Y. (1962) pp. 167–170.

*Primary Examiner*—Paul J. Killos
*Attorney, Agent, or Firm*—E. J. Holler

[57] ABSTRACT

There is disclosed a process for preparing low molecular weight, low viscosity, liquid polymeric materials by the polymerization of at least one selected acrylic monomer under a pressure in excess of atmospheric pressure and at a temperature not exceeding the ceiling temperature of the polymeric material product at the polymerization pressure. Preferably there is used a methacrylate monomer.

The resulting polymeric products can be used to prepare single-component coating vehicles which are non-drying at room temperature, but which can be cleanly removed by heating at elevated temperatures.

19 Claims, No Drawings

NOVEL PREPARATION OF NOVEL LOW MOLECULAR WEIGHT, LIQUID POLYMER

BACKGROUND OF THE INVENTION

This invention relates to the preparation of low molecular weight liquid polymers derived from at least one acrylic monomer.

The preparation of polymeric materials from acrylic monomers, such as methacrylate esters, is well known in the prior art. Typically, such polymerization processes are conducted at atmospheric pressure, and temperatures below about 120° C, and usually comprise the use of free-radical initiating reagents. Such polymerizations may be conducted in bulk, in solution, or in aqueous suspensions or emulsions. The recovered polymeric products are suitable for use as molding plastics, etc. However, because of their relatively high softening temperatures and/or high viscosities, the utility of such polymeric products in coating applications is largely limited to use in multi-component coating vehicles, in which solvents, emulsifiers, water, or other materials are also present.

In accordance with this invention, there is prepared a low molecular weight, low viscosity, liquid polymer which is especially useful as a non-drying, single-component fugitive coating vehicle.

More particularly, in accordance with this invention there is prepared a low molecular weight liquid polymeric material by the polymerizing of at least one selected acrylic monomer under a polymerization pressure in excess of atmospheric pressure and at a temperature not exceeding the ceiling temperature of the polymeric material at the polymerization pressure.

Typically in the practice of this invention, an acrylic monomer, such as an alkyl methacrylate, is subjected to thermal polymerization in an enclosed vessel with the polymerization temperature near, but slightly below, the 'ceiling temperature' of the polymer under the reaction conditions, such that the competition between propagation and depropagation processes leads to the formation of a polymer of low molecular weight.

For any given polymer-monomer system, there exists a 'ceiling temperature' at which the rate of polymerization becomes equal to the rate of depolymerization; see, for example, R. W. Lenz, 'Organic Chemistry of Synthetic High Polymers', Interscience Publishers, 1967, pages 325–329. At or near the ceiling temperature, the competition between polymerization and depolymerization processes leads to a lowering of the polymerization rate and of the molecular weight of the resulting polymer.

In conventional polymerization processes it is rarely possible to control molecular weight by the use of the ceiling temperature phenomenon, since the ceiling temperature is higher than the boiling point of the corresponding monomer(s). However, the evaporation of a volatile monomer can be avoided by carrying out the polymerization in an enclosed vessel, and/or by employing elevated pressures. The use of elevated pressure has the further effect of altering the ceiling temperature; that is, ceiling temperatures tend to increase at higher pressures.

Typically the process of this invention is conducted in an enclosed vessel such that the polymerization pressure can be derived autogenously by heating the monomer (or monomers) and/or the selective addition of an inert gas such as nitrogen.

A great advantage of this invention is that it may be conducted in the absence of a polymerization catalyst. However, it is anticipated that a catalyst may be utilized. As used herein, the term catalyst is intended to include reaction or polymerization initiators, promoters, etc. Typical catalysts include dialkyl peroxides, diacyl peroxides, peroxyesters, organic hydroperoxides, organic azo compounds, and metallo-organic reagents.

The process of this invention is most suitably conducted at polymerization pressures substantially in excess of atmospheric, usually about 2 to about 10 atmospheres, and at high elevated polymerization temperatures close to but not exceeding the ceiling temperature of the to-be-prepared polymer, usually about 200° C to about 300° C.

As used herein, the term "acrylic monomer" signifies an ester or other derivative of acrylic acid or of methacrylic acid.

Examples of suitable acrylic monomers include the following:

Methacrylate Esters

Methyl methacrylate
Ethyl methacrylate
n-Propyl methacrylate
n-Butyl methacrylate
Isopropyl methacrylate
Isobutyl methacrylate
n-Amyl methacrylate
n-Hexyl methacrylate
Isoamyl methacrylate
2-Hydroxyethyl methacrylate
2-Hydroxypropyl methacrylate
N,N-Dimethylaminoethyl methacrylate
N,N-Diethylaminoethyl methacrylate
t-Butylaminoethyl methacrylate
2-Sulfoethyl methacrylate
Trifluoroethyl methacrylate
Glycidyl methacrylate
Benzyl methacrylate
Allyl methacrylate
2-n-Butoxyethyl methacrylate
2-Chloroethyl methacrylate
sec-Butyl-methacrylate
tert-Butyl methacrylate
2-Ethylbutyl methacrylate
Cinnamyl methacrylate
Crotyl methacrylate
Cyclohexyl methacrylate
Cyclopentyl methacrylate
2-Ethoxyethyl methacrylate
Furfuryl methacrylate
Hexafluoroisopropyl methacrylate
Methallyl methacrylate
3-Methoxybutyl methacrylate
2-Methoxyethyl methacrylate
2-Nitro-2-methyl propyl methacrylate
n-Octyl methacrylate
2-Ethylhexyl methacrylate
2-Phenoxyethyl methacrylate
2-Phenylethyl methacrylate
Phenyl methacrylate
Propargyl methacrylate
Tetrahydrofurfuryl methacrylate
Tetrahydropyranyl methacrylate
Vinyl methacrylate

Other Methacrylic Acid Derivatives

Methacrylic Acid and its salts
Methacrylonitrile
Methacrylamide
N-Methylmethacrylamide
N-Ethylmethacrylamide
N,N-Diethylmethacrylamide
N,N-Dimethylmethacrylamide
N-Phenylmethacrylamide
Methacrolein

Acrylate Esters

Methyl Acrylate
Ethyl Acrylate
n-Propyl Acrylate
Isopropyl Acrylate
n-Butyl Acrylate
n-Decyl Acrylate

Other Acrylic Acid Derivatives

Acrylic Acid and its salts
Acrylonitrile
Acrylamide
Methyl alpha-Chloroacrylate
Methyl 2-Cyanoacrylate
N-Ethylacrylamide
N,N-Diethylacrylamide
Acrolein The present invention may also be applied to the preparation of copolymers from mixtures of two or more acrylic monomers. It is also contemplated that mixtures of at least one acrylic monomer and at least one non-acrylic ethylenic monomer may be polymerized in accordance with the present invention.

Suitable ethylenic monomers include:

Styrene
Vinyl Toluene (various isomers)
Alpha-methylstyrene
1,1-Diphenylethylene
Itaconic Acid
Dimethyl Itaconate
Di-n-butyl Itaconate
Mono-n-butyl Itaconate
Isobutylene
Diethyl Maleate
Diethyl Fumarate
Ethyl Cinnamate
Vinyl Acetate
Ethyl alpha-Phenylacrylate Thus as defined herein, the low molecular liquid polymers of this invention include both homopolymers and copolymers of one or more acrylic monomers.

The practice of this invention has certain distinct advantages over the prior art.

Such advantages include the following:
1. The availability of a variety of acrylic monomers will permit the preparation of a variety of polymers and copolymers, differing in their rheological properties, pigment-wetting characteristics, compatibility with other materials, etc.
2. Viscosity of the liquid polymers can be varied over a wide range, simply by varying the temperature at which polymerization is conducted.
3. Polymerization procedure is simple, and avoids the use of additional reagents, solvents, etc.; thus the process is expected to be more economical than conceivable alternative processes, such as the control of molecular weight by the addition of chain-transfer agents in solution polymerization, emulsion polymerization, etc.

The low molecular weight, low viscosity polymers of this invention are most suitable and ideal for use as single-component fugitive coating vehicles.

Fugitive vehicle systems are generally well known in the prior art, as evidenced for example by U.S. Letters Pat. 2,312,229 issued to Anderson which discloses a process for coating vitreous surfaces with fluorescent materials by suspending fluorescent powder in a binder comprising a solution of polystyrene in a solvent. Similar systems are disclosed by U.S. Letters Pat. No. 2,328,101 issued to Rosenblatt and U.S. Letters Pat. 3,475,161 issued to Ramirez.

Fugitive vehicle systems have been especially useful in the coating art. Thus particulate coating materials are commonly applied to substrates by a wet process, that is, while dispersed in a system consisting of a binder and a solvent. Such a process typically requires mixing of a binder, a solvent, and an inorganic material to form a paste or slurry which is applied to the surface to be coated.

The wet coating technique is commonly used to seal glass or ceramic parts, as in the formation of cathode ray tubes wherein the face plate is attached to the funnel. In this technique, a paste having solder glass distributed throughout a binder-solvent system is applied to the edges of one part in the form of a ribbon. The remaining part is then placed in contact with the paste and the assemblage is heated to evaporate the solvent, burn out the binder, and fuse the solder glass. While this technique is extensively used, quality control is difficult and expensive because of carbonaceous or like residue which may not be removed by evaporation or burning during the heating step. Likewise, during the evaporation of the solvent, there may be changes in the viscosity and/or thixotropic character of the system which may result in such deleterious effects as orange peel formation, fish eye formation, etc., especially on flat surfaces.

In an effort to overcome the difficulties inherent in applying a coating or sealant to substrates via a binder-solvent system, the prior art has used dry coating compositions containing polymeric binders and having the particulate coating material uniformly distributed therethrough. These compositions are formed into films which are applied to the substrate to be coated and then heated to burn out the binder and form a coating of the inorganic material usually in fused or sintered form. However, the presence of carbonaceous residue may still present a problem in such a system.

Fugitive systems have also been disclosed wherein there is utilized both a polymer and solvent. For example, in copending U.S. patent application Ser. No. 825,410, filed May 16, 1969 by Fred E. Mansur and copending U.S. patent application Ser. No. 806,320, filed Mar. 11, 1969 by Don N. Gray and John D. Grier, both applications being assigned to the same assignee as the instant application, there are disclosed novel wet coating systems comprising liquid poly (alpha substituted) styrene dispersed in a cyclic isoprenoid solvent.

In accordance with this invention, there is provided a low molecular weight, low viscosity liquid polymer, useful as a single-component coating vehicle which does not require the presence of other components, such as solvents, and which is non-drying at room temperature, but cleanly removable by heating to elevated temperatures, e.g., by pyrolysis and/or vaporization.

In addition to their utility as single-component coating vehicles, the products prepared in accordance with the invention are useful as plasticizers, as additives in paints and printing inks, and as adhesives or components thereof.

The low molecular weight liquid polymers of this invention may be utilized in the fabrication of gas discharge panels, such as the type disclosed in U.S. Letters Pat. No. 3,499,167 issued to Baker et al. In this, utilization, it may be used for the application of electrodes, dielectric material, phosphor material, and/or sealing of substrates.

It is also contemplated that the process of this invention may be used to convert high molecular polymers to low molecular weight liquid polymers, such as by heating of a high molecular weight acrylic polymer in an enclosed vessel at or near the polymer ceiling temperature, in the presence or absence of free-radical initiators, and then recovering the resulting low molecular weight, liquid polymer.

The following examples are some of the best process embodiments contemplated by the inventor in the practice of this invention.

EXAMPLE 1

Ten milliliters (ml.) of distilled n-butyl methacrylate monomer was sealed under nitrogen in a glass tube. The tube was placed in a protective metal sleeve and heated 16 hrs. at 262° C. The tube was then opened and the sample, now a clear viscous liquid, was allowed to drain into a weighing dish. After drying under an infrared lamp to remove any residual monomer, the resulting liquid polymer weighed 7.8 grams (g.). Thermogravimetric analysis (at 10° C./min. in air) of the product indicated negligble vaporization below 100° C., but essentially complete vaporization between 100 and 350° C.

EXAMPLE 2

A 10-ml. sample of distilled methyl methacrylate monomer was sealed under nitrogen in a glass tube. The tube was placed in a protective metal sleeve and heated 18 hrs. at 230° C. The tube was allowed to cool to room temperature, then opened. The sample, now a clear, viscous liquid, was allowed to drain into a weighing dish and dried under an infrared lamp. This yielded 3.9 g. of liquid polymer. Thermogravimetric analysis (at 10° C./min. in air) of the product indicated negligible vaporization below 100° C., but essentially complete vaporization at 100°–400° C.

EXAMPLE 3

Ten-ml. samples of distilled n-butyl methacrylate were subjected to sealed-tube polymerization, in the manner described in Example 1, at each of the following temperatures: 230°, 240°, 248°, and 280° C. In each case, a liquid polymer was obtained; polymerizations at higher temperatures yielded products of lower viscosity. Thermogravimetric analyses gave results similar to those described in Example 1.

The polymeric products of this invention have a lower molecular weight and viscosity relative to the same polymeric material prepared at atmospheric pressure and lower temperatures, such as below about 50° C.

Typically the recovered polymeric material has a number-average molecular weight, as measured by vapor-pressure osmometry, of less than about 5000 and a viscosity at 25° C of less than about 200,000 centipoises, as measured with a Brookfield viscometer.

I claim:

1. A process for preparing a low molecular weight liquid, polymeric, thermally removable coating vehicle which comprises
    polymerizing, in the absence of a chain transfer agent, at least one selectd acrylic monomer under a pressure of about 2 to about 10 atmospheres and at a temperature of about 200° C to about 300° C and close to but not exceeding the ceiling temperature of the polymeric material at the polymerization pressure, said acrylic monomer being a derivative of an acid selected from the group consisting of acrylic acid and methacrylic acid
    and recovering a polymeric material having a number-average molecular weight less than about 5000 and a viscosity at 25° C of less than about 200,000 centipoises which is a lower viscosity relative to polymeric material prepared from the same acrylic monomer at atmospheric pressure and at a temperature below about 50° C.

2. The process of claim 1 wherein the polymerization is conducted in an enclosed vessel.

3. The process of claim 2 wherein the polymerization pressure is autogenously generated from the heating of the selected monomer.

4. The process of claim 1 wherein the polymerization is conducted in the absence of a polymerization catalyst.

5. The process of claim 1 wherein the polymerization is conducted in the presence of a polymerization catalyst.

6. The process of claim 1 wherein there is polymerized at least one methacrylate ester.

7. The process of claim 6 wherein there is polymerized at least two different methacrylate esters.

8. The process of claim 1 wherein there is polymerized at least one methacrylate ester and at least one ethylenic monomer.

9. The process of claim 1 wherein said acrylic monomer is an acrylate ester.

10. The process of claim 1 wherein said acrylic monomer is a methacrylate ester.

11. The process of claim 1 further comprising the step of removing any residual monomer after said polymerization step and before said recovery step.

12. The process of claim 11 wherein said methacrylate ester is selected from the group consisting of methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxyethyl methacrylate, 2-nitro-2-methyl propyl methacrylate, n-octyl methacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, and vinyl methacrylate.

13. The process of claim 8 wherein said methacrylate ester is selected from the group consisting of methyl methacrylate ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxyethyl methacrylate, 2-nitro-2-methyl propyl methacrylate, n-octyl methacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, and vinyl methacrylate; and said ethylenic monomer is selected from the group consisting of styrene, vinyl toluene, alpha-methylstyrene, 1,1-diphenylethylene, itaconic acid, dimethyl itaconate, di-n-butyl itaconate, mono-n-butyl itaconate, isobutylene, diethyl maleate, diethyl furmarate, ethyl cinnamate, vinyl acetate, and ethyl alpha-phenylacrylate.

14. The process of claim 1 wherein there is polymerized at least one acrylate ester.

15. The process of claim 14 wherein said acrylate ester is selected from the group consisting of methyl acrylate, ethyl acrylte, n-propyl acrylate, isopropyl acrylate, n-butyl acrylate, and n-decyl acrylate.

16. The process of claim 1 wherein there is polymerized a methacrylic acid derivative selected from the group consisting of methacrylic acid, methacrylic acid salt, methacrylonitrile, methacrylamide, N-methylmethacrylamide, N-ethylmethacrylamide, N,N-diethylmethacrylamide, N,N-dimethylmethacrylamide, N-phenylmethacrylamide, and methacrolein.

17. The process of claim 1 wherein there is polymerized at least one acrylic acid derivative selected from the group consisting of acrylic acid, acrylic acid salt, acrylonitrile, acrylamide, methyl alpha-chloroacrylate, methyl 2-cyanoacrylate, N-ethylacrylamide, N,N-diethylacrylamide and acrolein.

18. The process of claim 1 wherein said polymerizing step is conducted in the absence of a polymerization catalyst.

19. The process of claim 18 wherein said polymerizing step is conducted in the absence of a solvent.

* * * * *